June 13, 1939.  L. BRILES  2,162,325
FISH SCREEN
Filed Jan. 12, 1938
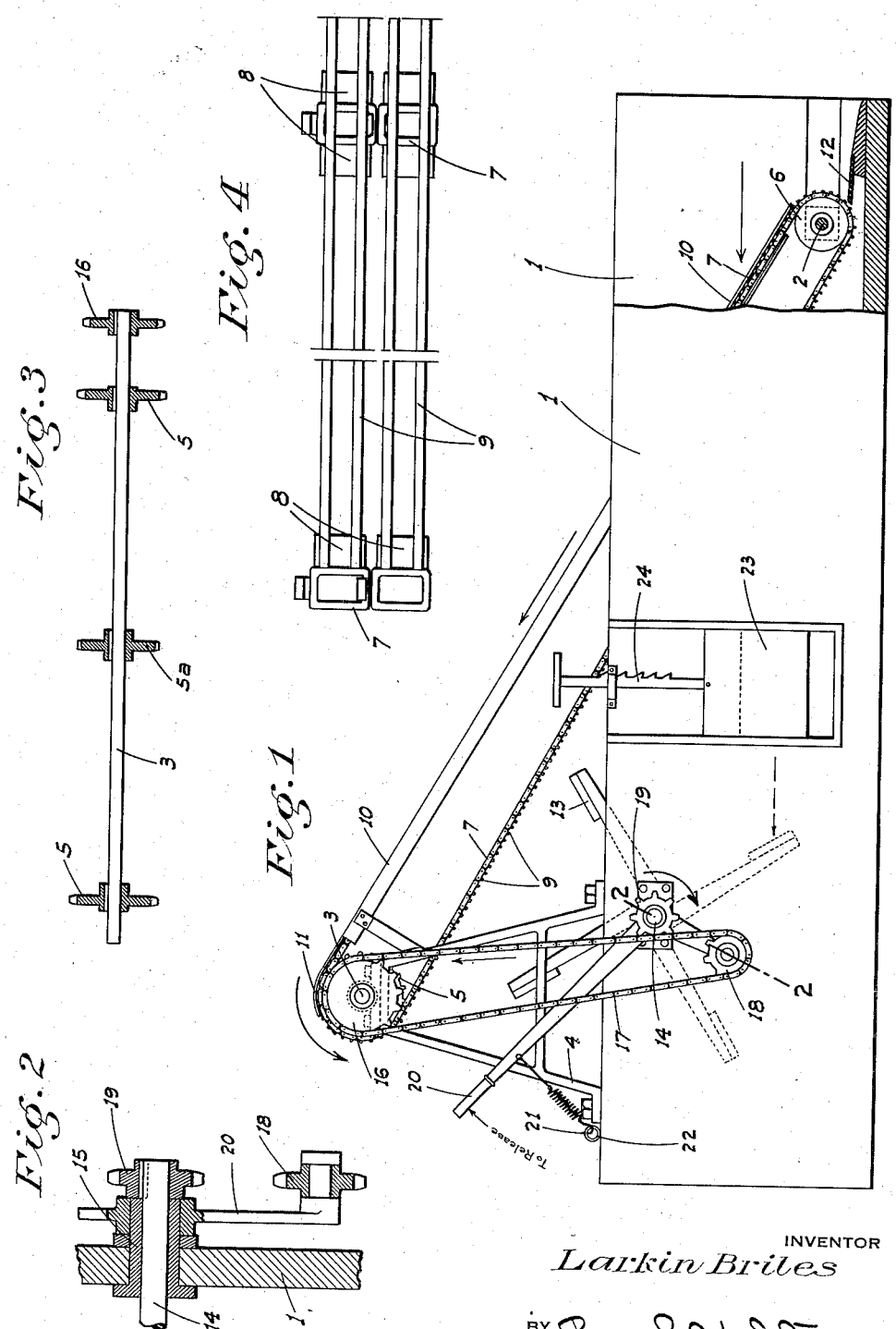
INVENTOR
*Larkin Briles*
BY
ATTORNEY Patented June 13, 1939

2,162,325

UNITED STATES PATENT OFFICE 2,162,325

FISH SCREEN

Larkin Briles, Chico, Calif., assignor of one-half to Henry J. Coffee, Modesto, Calif.

Application January 12, 1938, Serial No. 184,584

4 Claims. (Cl. 210—175)

This invention relates generally to an automatic fish screen for canals, ditches and the like, and in particular relates to, and it is my principal object to provide, a fish screen which when in operation successfully prevents passage of fish beyond the screen but is so arranged that debris carried by the stream of water passing the screen cannot clog, jam or damage the same. My improved fish screen operates to pick up all debris and to deposit such debris back into the stream beyond the screen.

Another object of my invention is to provide a fish screen including an endless moving screen unit of unique construction; the endless screen unit being driven by a separate stream actuated water wheel mounted for selective driving connection with said screen unit.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation, partly in section, of my improved fish screen.

Figure 2 is an enlarged, fragmentary cross section on line 2—2 of Fig. 1.

Figure 3 is a fragmentary view of the upper screen-supporting sprocket unit.

Figure 4 is a fragmentary plan view of the screen.

Referring now more particularly to the characters of reference on the drawing, my improved fish screen comprises a pair of transversely spaced, vertically disposed side walls 1 of substantial height and length, such plates being secured together and adapted to be disposed in, or actually forming the side walls of, a ditch or canal C in any suitable manner so that the full stream must pass therebetween.

A transverse shaft 2 is journaled between the side walls adjacent the lower edge and relatively close to the forward ends thereof, while another transverse shaft 3 is mounted on brackets 4 supported from the walls above the same and some distance rearwardly of shaft 2 relative to the direction of flow of the stream. The upper shaft 3 is provided with fixed end sprockets 5 and an intermediate sprocket 5a having very shallow teeth; while the lower shaft 2 is provided with rollers 6, the rollers 6 and sprockets 5 being disposed immediately adjacent the side walls 1.

Endless chains 5 engage the sprocket 5 and 5a in driving relation and extend at a downward slope to and engage the corresponding rollers 6. Each chain link is provided with attachment pads 8 and cross rods 9 (preferably two to each link) and are secured between corresponding attachment pads of the spaced chains. These rods are close together, and form the fish screen per se. The use of the intermediate chains and sprockets prevents undue sagging of the screen rods in the event that they are quite long. The uper runs of the outer endless chains 7 are carried in and supported against sagging by channel members 10 which project inwardly from the side walls 1. The upper flange of each channel member is extended, as at 11, so as to overlie the corresponding chain to a point at the top of the sprocket and protect the chain on the sprocket.

A flexible lip 12, such as one of rubber, extends across between the side walls and is disposed ahead of the endless screen unit, this lip terminating adjacent the chains below the shaft 2 so as not to interfere with a flow of water below said shaft.

A water wheel 13 of conventional form is mounted on a cross shaft 14 journaled in boxes 15 supported from the side walls 1 and projecting outwardly from one wall. This wheel is disposed beyond the fish screen directly under the upper portion of the screen, so that the latter discharges at its upper end into the stream clear of the water wheel, thus preventing debris from falling on the wheel.

One end of shaft 3 extends outwardly of the adjacent side wall 1 and another sprocket 16 is keyed thereon. An endless chain 17 passes about and depends from this sprocket and about another sprocket 18 disposed below and to one side of the projecting end portion of shaft 14. Said end portion carries a sprocket 19 alined with but normally spaced from the adjacent rim of chain 17. A lever 20 is pivoted intermediate its ends on the adjacent journal box 15 and at its lower end supports the sprocket 18. By swinging the lever in one direction or the other the run of the chain 17 adjacent sprocket 19 may be moved into or out of engagement therewith; being yieldably and releasably held in such engagement by a spring hook element 21 mounted on the lever and adapted to engage an eye 22 on the adjacent wall 1.

By means of this arrangement, the upper run of the fish screen will be driven in the direction of the flow of the stream as is desired, while the water wheel itself is rotating in a relatively opposite direction.

When so driven, all debris carried by the stream is picked up by the cleats of endless screen unit, which serves as a conveyor, and such debris is carried up to the top of the screen unit and discharged back into the stream beyond the screen unit and the water wheel. In this manner no debris can accumulate and jam the device as has occurred in many previous fish screens.

When my device is used in ditches, etc., from which water for mining operations is diverted, I provide a gate 23 in one side plate and below the upper portion of the screen unit. A suitable catch bar 24 holds the gate in any selected position. By mounting the gate in a position intermediate the ends of the screen unit, debris-free water can be diverted through the gate.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A fish screen for a stream of water, said screen comprising a pair of side walls adapted to be disposed with the stream passing therebetween, an endless screen conveyor mounted between the walls and extending lengthwise relative to the direction of flow of the stream with an upward incline in said direction from adjacent the bottom of the stream, means to drive the screen so that its upper reach travels in such direction and a water discharge gate in one wall beyond the lower or pick up end of the screen but ahead of the upper or debris discharge end thereof.

2. A fish screen for a stream of water, said screen comprising a pair of side members adapted to be disposed with the stream passing therebetween, an endless screen conveyor of a width substantially the distance between said members, means mounting said screen between said members and lengthwise relative to the direction of flow of the stream, the screen being inclined upwardly in said direction from adjacent the bottom of the stream, and terminating at its upper end above the highest possible level of the stream, a water wheel mounted between the side members and disposed under the screen so that the latter discharges into the stream beyond the water wheel, and means between the water wheel and screen to drive the latter.

3. A fish screen for a stream of water, said screen comprising a pair of side members adapted to be disposed with the stream passing therebetween, an endless screen conveyor, means mounting the screen between said members lengthwise of the stream and at an upward incline in the direction of flow of the stream from adjacent the bottom thereof, said means including a transverse shaft at the high end of the screen and a sprocket on one end of the shaft; a water wheel turnably mounted under the screen in position to be turned by the water below the axis of the wheel, a sprocket fixed axially with the wheel, a rigid radial arm turnable axially of the wheel and projecting rearwardly thereof, a sprocket turnably mounted on the outer end of the arm, an endless chain extending between said last and first named sprockets, the forward run of said chain being rearwardly of the wheel sprocket and adapted to engage the back side thereof only when the arm is disposed at a predetermined downward angle and the chain being then substantially taut; manually controlled means to swing the arm upwardly from such angular position, or to retain the arm in said position.

4. A structure as in claim 3, in which said last named means comprises a lever upstanding from and rigid with the arm and a releasable spring acting on the lever in a direction to swing the arm down beyond said predetermined angular position.

LARKIN BRILES.